United States Patent
Wu (10) Patent No.: US 11,537,261 B2
(45) Date of Patent: Dec. 27, 2022

(54) HOME SCREEN INTERFACE APPLICATION ICON MOVING METHOD AND TERMINAL DEVICE

(71) Applicant: VIVO MOBILE COMMUNICATION CO., LTD., Guangdong (CN)

(72) Inventor: Lingmin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/535,952

(22) Filed: Nov. 26, 2021

(65) Prior Publication Data

US 2022/0083204 A1 Mar. 17, 2022

Related U.S. Application Data

(63) Continuation of application No. PCT/CN2020/086119, filed on Apr. 22, 2020.

(30) Foreign Application Priority Data

May 27, 2019 (CN) .......................... 201910445437.9

(51) Int. Cl.
G06F 3/04845 (2022.01)
G06F 3/04817 (2022.01)

(52) U.S. Cl.
CPC ...... *G06F 3/04817* (2013.01); *G06F 3/04845* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 7,533,035 B1 * | 5/2009 | Abend | G06Q 10/06 705/7.36 |
| 7,596,760 B2 | 9/2009 | Sauve et al. | |
| 2012/0096403 A1 | 4/2012 | Jung et al. | |

(Continued)

FOREIGN PATENT DOCUMENTS

| | | |
|---|---|---|
| CN | 102457617 A | 5/2012 |
| CN | 103034390 A | 4/2013 |

(Continued)

OTHER PUBLICATIONS

"How to create and organize iOS folders" (published on Jun. 20, 2011 by Lex Friedman) https://www.macworld.com/article/212616/create-organize-ios-folders.html.*

(Continued)

*Primary Examiner* — Rinna Yi
(74) *Attorney, Agent, or Firm* — IP & T Group LLP (57) ABSTRACT

An icon moving method includes: receiving a first input performed by a user for a first application icon in a first home screen interface; displaying an indication identifier and a thumbnail of a second home screen interface in response to the first input, where an indication end of the indication identifier points to a first position in the thumbnail of the second home screen interface; receiving a second input performed by the user; and controlling, in response to the second input, the first application icon to move to a second position, corresponding to the first position, in the second home screen interface.

15 Claims, 4 Drawing Sheets

(56) References Cited

U.S. PATENT DOCUMENTS

| | | | | |
|---|---|---|---|---|
| 2013/0265251 A1* | 10/2013 | Arakawa | ................ | G06F 3/041 |
| | | | | 345/173 |
| 2014/0013254 A1* | 1/2014 | Hosein | ................ | G06F 3/04883 |
| | | | | 715/765 |
| 2014/0068481 A1* | 3/2014 | O'Connor | ............... | G06F 9/453 |
| | | | | 715/769 |
| 2014/0075389 A1 | 3/2014 | Kim | | |
| 2017/0115849 A1* | 4/2017 | Yang | ................ | G06F 3/04817 |

FOREIGN PATENT DOCUMENTS

| | | | |
|---|---|---|---|
| CN | 103677485 | A | 3/2014 |
| CN | 105975142 | A | 9/2016 |
| CN | 107704157 | A | 2/2018 |
| CN | 110209313 | A | 9/2019 |
| EP | 3089017 | A1 | 11/2016 |

OTHER PUBLICATIONS

International Search Report of International Application No. PCT/CN2020/086119 dated Jul. 1, 2020.

Nritten Opinion of The International Searching Authority of International Application No. PCT/CN2020/086119 dated Jul. 1, 2020.

First Office Action of Priority Application No. 201910445437.9 dated Jun. 1, 2020.

The Second Office Action of Priority Application No. 201910445437.9 dated Nov. 2, 2020.

Extended European Search Report for application 20814134.1 issued by the European Patent Office dated Jun. 30, 2022.

\* cited by examiner

ND TERMINAL
HOME SCREEN INTERFACE APPLICATION ICON MOVING METHOD AND TERMINAL DEVICE

CROSS-REFERENCE TO RELATED APPLICATIONS

This application is a Bypass Continuation Application of PCT/CN2020/086119 filed on Apr. 22, 2020, which claims priority to Chinese Patent Application No. 201910445437.9 filed on May 27, 2019, which are incorporated herein by reference in their entirety.

TECHNICAL FIELD

The present disclosure relates to the technical field of communication application, and in particular, to an icon moving method and a terminal device.

BACKGROUND

With the improvement of living standards, people's requirements for mobile phone screens also become increasingly high. As mobile phone screens become increasingly large, dragging an icon between different screens is increasingly difficult. For example, a current foldable screen becomes a relatively large screen after being unfolded. With the continuous improvement of configuration and storage space of mobile phones, people keep a plurality of application icons on a desktop. By default, an icon of a newly installed application is displayed on the last screen. In this case, dragging this icon to a home screen of the desktop requires crossing a relatively long distance between the screens, which is time-consuming and effort-consuming.

SUMMARY

According to a first aspect, an embodiment of the present disclosure provides an icon moving method. The icon moving method is performed by a terminal device, where the terminal device includes at least a first home screen interface and a second home screen interface, and the method includes:

receiving a first input performed by a user for a first application icon in the first home screen interface;

displaying an indication identifier and a thumbnail of the second home screen interface in response to the first input, where an indication end of the indication identifier points to a first position in the thumbnail of the second home screen interface;

receiving a second input performed by the user; and controlling, in response to the second input, the first application icon to move to a second position, corresponding to the first position, in the second home screen interface.

According to a second aspect, an embodiment of the present disclosure further provides a terminal device. The terminal device includes at least a first home screen interface and a second home screen interface, and further includes:

a first receiving module, configured to receive a first input performed by a user for a first application icon in the first home screen interface;

a first response module, configured to display an indication identifier and a thumbnail of the second home screen interface in response to the first input, where an indication end of the indication identifier points to a first position in the thumbnail of the second home screen interface;

a second receiving module, configured to receive a second input performed by the user; and a second response module, configured to control, in response to the second input, the first application icon to move to a second position, corresponding to the first position, in the second home screen interface.

According to a third aspect, an embodiment of the present disclosure provides a terminal device. The terminal device includes a processor, a memory, and a program stored in the memory and executable on the processor. The program implements, when executed by the processor, the steps of the foregoing icon moving methods.

According to a fourth aspect, an embodiment of the present disclosure further provides a non-transitory computer-readable storage medium. The non-transitory computer-readable storage medium stores a program, and when the program is executed by a processor, the steps of the foregoing icon moving methods are implemented.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

Figure 1:
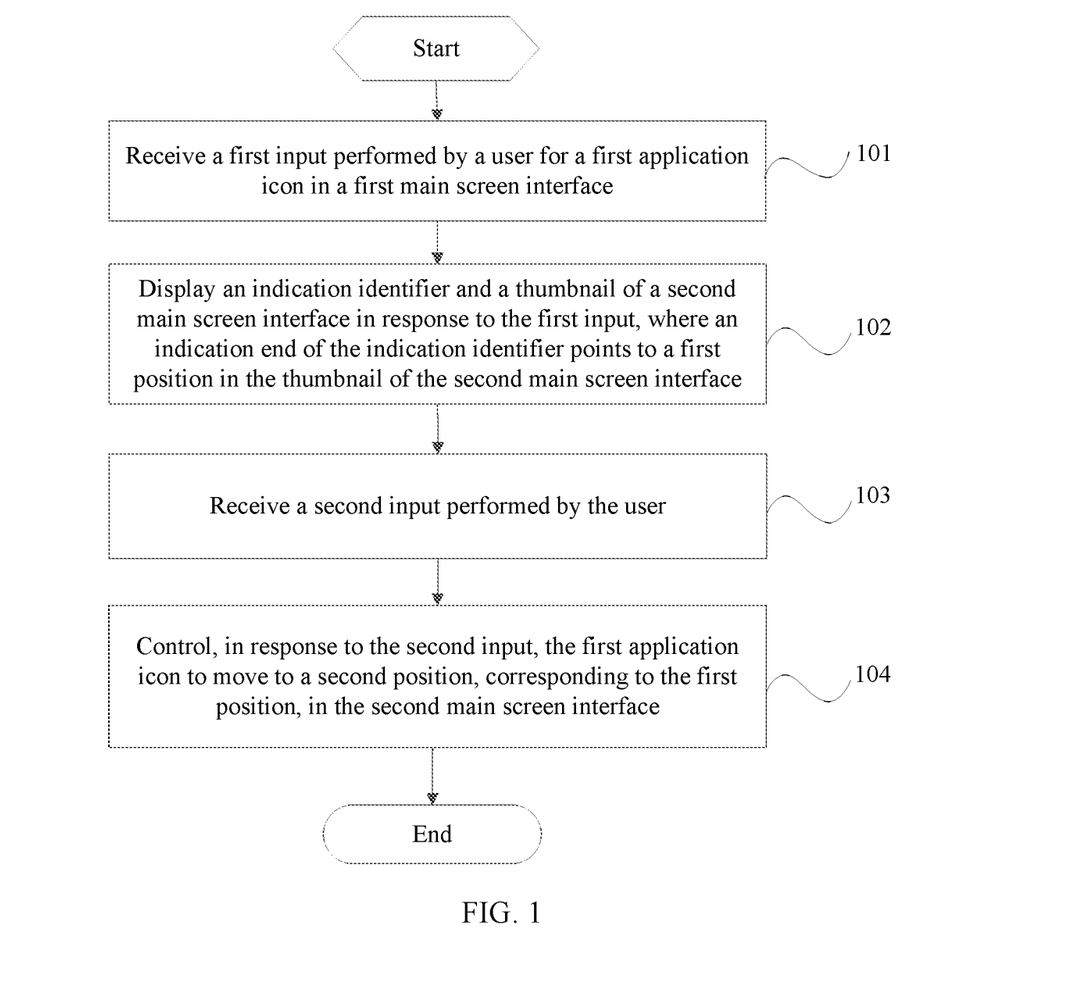
FIG. 1 is a schematic flowchart of an icon moving method according to an embodiment of the present disclosure.

FIG. 1 is a schematic flowchart of an icon moving method according to an embodiment of the present disclosure. The following describes an implementation process of the method with reference to this figure.

The icon moving method is performed by a terminal device. The terminal device includes at least a first home screen interface and a second home screen interface. The terminal device includes but is not limited to a mobile phone, a tablet computer, a notebook computer, a palmtop computer, an in-vehicle terminal, a wearable device, and the like. The method may include the following steps:

Step 101: Receive a first input performed by a user for a first application icon in the first home screen interface.

The first home screen interface may display a plurality of application icons. The first input may be a long-pressing input. After the first input performed by the user for the first application icon in the first home screen interface is received, all application icons in the first home screen interface may enter a twinkling state, so as to inform the user that the application icons can be moved.

Step 102: Display an indication identifier and a thumbnail of the second home screen interface in response to the first input, where an indication end of the indication identifier points to a first position in the thumbnail of the second home screen interface.

Herein, in response to the first input, a thumbnail of the first home screen interface may also be displayed, in addition to the indication identifier and the thumbnail of the second home screen interface.

Figure 2:
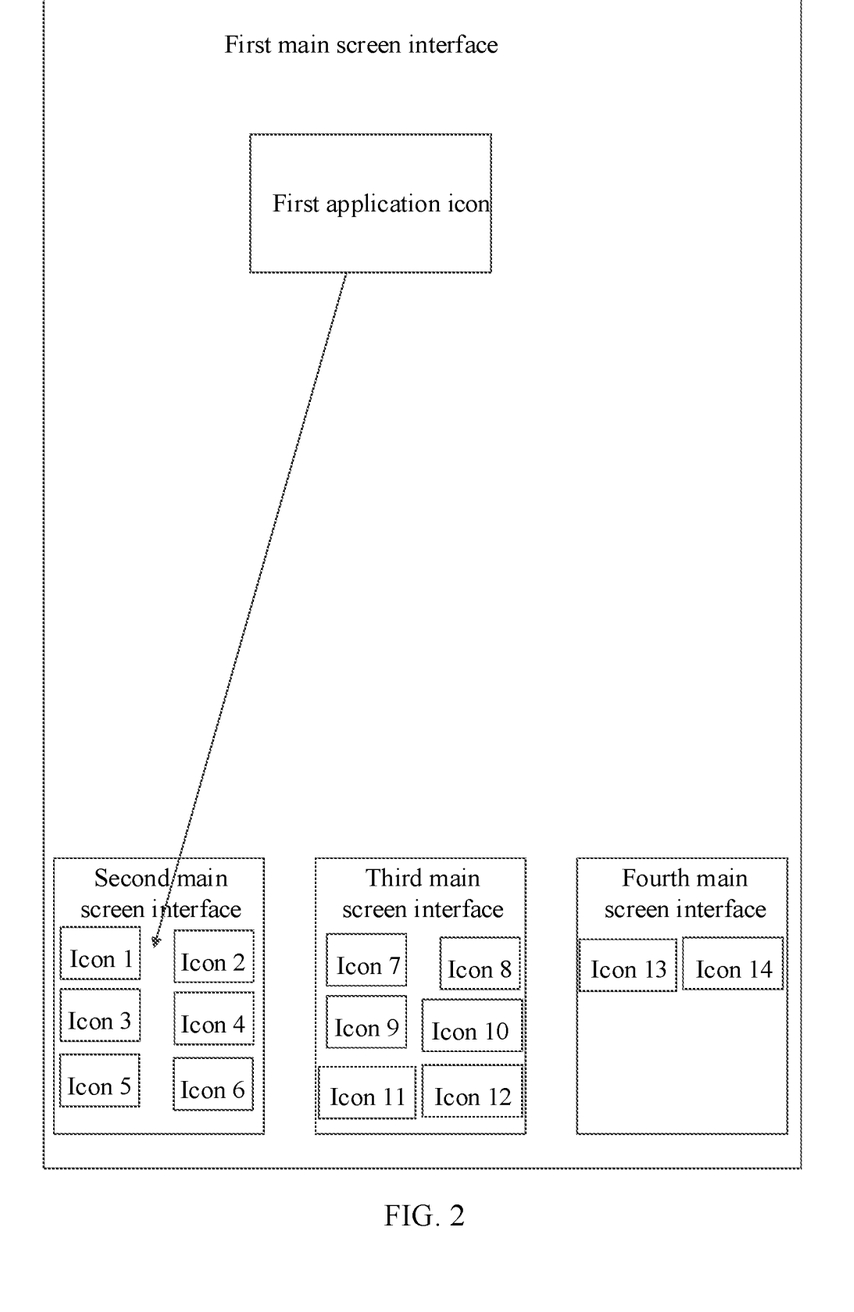
FIG. 2 is a schematic diagram of layout of an indication identifier and thumbnails of home screen interfaces according to an embodiment of the present disclosure.

As shown in FIG. 2, the indication identifier may be an indication line segment with an arrow. An end, provided with the arrow, of the indication line segment is the indication end. An end, not provided with the arrow, of the indication line segment may be disposed on the first application icon. The second home screen interface may be a home screen interface in front of the first home screen interface. The first position may be a blank position (a position where no application icons are displayed) in the thumbnail of the second home screen interface, or may be a position where an application icon is displayed in the second home screen interface. In addition, in this embodiment of the present disclosure, the user can adjust the position to which the indication end of the indication identifier points. In this embodiment of the present disclosure, a shape of the indication line segment is not specifically limited. The indication line segment may be a dashed line or a solid line.

As shown in FIG. 2, the thumbnails of the foregoing at least two home screen interfaces may be displayed in the lower part of the first home screen interface in order, or displayed around the first application icon.

Optionally, display content corresponding to the first position may be amplified for displaying, so that the user can view position information of the first position in the thumbnail conveniently. For example, when the display content corresponding to the first position is blank, a blank area is amplified for displaying; or when an application icon is displayed in the display content corresponding to the first position, the application icon displayed corresponding to the first position is amplified for displaying.

In addition, in this embodiment of the present disclosure, at least one indication identifier may be displayed in response to the first input. For example, when the first home screen interface is the last home screen interface of the at least two home screen interfaces, one indication identifier may be displayed, and an indication end of the indication identifier may point to a first position in a thumbnail of a previous home screen interface. When the first home screen interface is an intermediate home screen interface of the at least two home screen interfaces, that is, there is a home screen interface in front of the first home screen interface and a home screen interface behind the first home screen interface, two indication identifiers may be displayed, and indication ends of the two indication identifiers may point to a first target position in the home screen interface in front of the first home screen interface and a second target position in the home screen interface behind the first home screen interface, respectively.

Step 103: Receive a second input performed by the user.

The second input may be a sliding input along the indication identifier.

Step 104: Control, in response to the second input, the first application icon to move to a second position, corresponding to the first position, in the second home screen interface.

Herein, positions in the thumbnail of the second home screen interface are in one-to-one correspondence with positions in the second home screen interface. In other words, a position of an application icon in the second home screen interface corresponds to a position of the application icon in the thumbnail of the second home screen interface. For example, in a case that the first application icon is between icon 1 and icon 2 in the thumbnail of the second home screen interface, a first application icon is also between icon 1 and icon 2 in the second home screen interface.

The icon moving method in this embodiment of the present disclosure includes: receiving a first input performed by a user for a first application icon in a first home screen interface; displaying an indication identifier and a thumbnail of a second home screen interface in response to the first input, where an indication end of the indication identifier points to a first position in the thumbnail of the second home screen interface; receiving a second input performed by the user; and controlling, in response to the second input, the first application icon to move to a second position, corresponding to the first position, in the second home screen interface. In the embodiments of the present disclosure, the first application icon in the first home screen interface can be moved to the second home screen interface via just the second input performed by the user for the indication identifier, which avoids crossing a relatively long distance between screens, and is simple, fast, and convenient.

Optionally, the displaying an indication identifier and a thumbnail of the second home screen interface in response to the first input includes the following sub-steps.

Display the indication identifier and the thumbnail of the second home screen interface in response to the first input, where the indication end of the indication identifier points to a predetermined position.

The predetermined position may be a blank position in a home screen in front of the first home screen interface.

Receive a third input performed by the user for the indication identifier.

Herein, the third input may be an input performed by the user for dragging the indication end of the indication identifier to move from the predetermined position to the first position in the thumbnail of the second home screen interface. Owing to the third input, the user implements adjustment of the position to which the indication end of the indication identifier points. When the indication identifier is an indication line segment with an arrow, the third input may alternatively be an input performed by the user for dragging the line segment of the indication identifier. A position indicated by the indication end is adjusted by dragging the line segment.

Control, in response to the third input, the indication end of the indication identifier to move from the predetermined position to the first position.

Owning to the third input, the user points the indication end of the indication identifier at an after-adjustment position of the first application icon. Therefore, cross-screen adjustment of the first application icon can be realized conveniently and fast.

Optionally, the controlling, in response to the second input, the first application icon to move to a second position, corresponding to the first position, in the second home screen interface includes the following sub-steps.

In a case that a second application icon is displayed at the second position, group the first application icon and the second application icon into a folder, and display the folder at the second position.

In this embodiment of the present disclosure, in the case that the second application icon is displayed at the second position, the first application icon and the second application icon are grouped into one folder for displaying, which implements group displaying of the two icons.

In a case that no application icons are displayed at the second position, directly move the first application icon to the second position.

Optionally, after the displaying an indication identifier and a thumbnail of the second home screen interface in response to the first input, the method further includes the following steps.

Receive a fourth input performed by the user for at least one third application icon in the first home screen interface.

Herein, the third application icon is another application icon that is in the first home screen interface and that is different from the first application icon. The fourth input may be an input for dragging the at least one third application icon onto the indication identifier.

Display the at least one third application icon on the indication identifier in response to the fourth input.

Herein, after the fourth input is received, the at least one third application icon is dragged onto the indication line segment, so that subsequent adjustment of a position of the at least one third application icon can be implemented conveniently.

Based on this, after the receiving a second input performed by the user, the method further includes:

in response to the second input, controlling the at least one third application icon to be displayed behind the second position in order.

For example, according to an arrangement sequence of the at least one third application icon on the indication identifier, control the at least one third application icon to be displayed behind the second position in order.

For example, in a case that icon 1 of the at least one third application icon is behind the first application icon, and icon 2 of the at least one third application icon is behind icon 1, display icon 1 behind the first application icon, and display icon 2 behind icon 1.

In a specific embodiment of the present disclosure, cross-screen moving of a plurality of application icons can be implemented just by sequentially dragging the plurality of application icons onto the indication identifier. In addition, a position relationship among the plurality of application icons can be adjusted on the indication identifier, thereby meeting different position requirements.

The icon moving method in this embodiment of the present disclosure includes: receiving a first input performed by a user for a first application icon in a first home screen interface; displaying an indication identifier and a thumbnail of a second home screen interface in response to the first input, where an indication end of the indication identifier points to a first position in the thumbnail of the second home screen interface; receiving a second input performed by the user; and controlling, in response to the second input, the first application icon to move to a second position, corresponding to the first position, in the second home screen interface. In the embodiments of the present disclosure, the first application icon in the first home screen interface can be moved to the second home screen interface via just the second input performed by the user for the indication identifier, which avoids crossing a relatively long distance between screens, and is simple, fast, and convenient.

Figure 3:
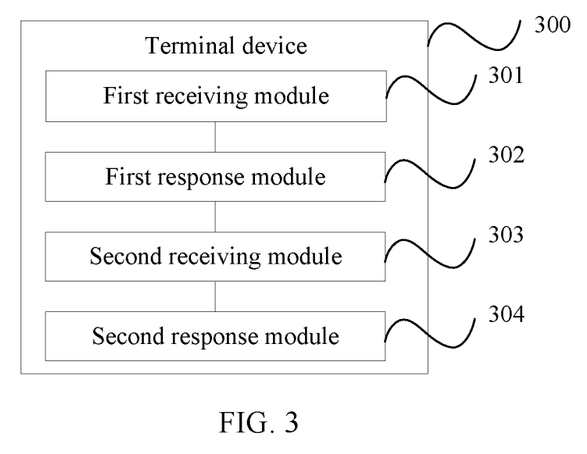
FIG. 3 is a first schematic diagram of modules of a terminal device according to an embodiment of the present disclosure.

An embodiment of the present disclosure further provides a terminal device. The terminal device includes at least a first home screen interface and a second home screen interface. As shown in FIG. 3, the terminal device 300 further includes:

a first receiving module 301, configured to receive a first input performed by a user for a first application icon in the first home screen interface;

a first response module 302, configured to display an indication identifier and a thumbnail of the second home screen interface in response to the first input, where an indication end of the indication identifier points to a first position in the thumbnail of the second home screen interface;

a second receiving module 303, configured to receive a second input performed by the user; and a second response module 304, configured to control, in response to the second input, the first application icon to move to a second position, corresponding to the first position, in the second home screen interface.

Figure 4:
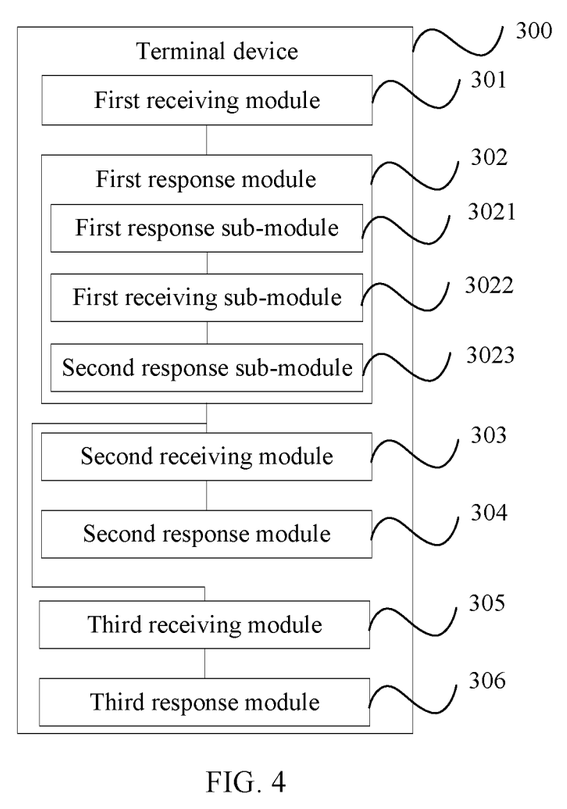
FIG. 4 is a second schematic diagram of modules of a terminal device according to an embodiment of the present disclosure.

In the terminal device in this embodiment of the present disclosure, as shown in FIG. 4, the first response module 302 includes:

a first response sub-module 3021, configured to display the indication identifier and the thumbnail of the second home screen interface in response to the first input, where the indication end of the indication identifier points to a predetermined position;

a first receiving sub-module 3022, configured to receive a third input performed by the user for the indication identifier; and a second response sub-module 3023, configured to control, in response to the third input, the indication end of the indication identifier to move from the predetermined position to the first position.

In the terminal device in this embodiment of the present disclosure, the second response module 304 is configured to: in a case that a second application icon is displayed at the second position, group the first application icon and the second application icon into a folder, and display the folder at the second position.

The terminal device in this embodiment of the present disclosure further includes:

a third receiving module 305, configured to: after the first response module displays the indication identifier and the thumbnail of the second home screen interface in response to the first input, receive a fourth input performed by the user for at least one third application icon in the first home screen interface; and a third response module 306, configured to display the at least one third application icon on the indication identifier in response to the fourth input.

In the terminal device in this embodiment of the present disclosure, the second response module is further configured to: in response to the second input, control the at least one third application icon to be displayed behind the second position in order.

In the terminal device in this embodiment of the present disclosure, the second response module is configured to: according to an arrangement sequence of the at least one third application icon on the indication identifier, control the at least one third application icon to be displayed behind the second position in order.

The terminal device in this embodiment of the present disclosure is configured to: receive a first input performed by a user for a first application icon in a first home screen interface; display an indication identifier and a thumbnail of a second home screen interface in response to the first input, where an indication end of the indication identifier points to a first position in the thumbnail of the second home screen interface; receive a second input performed by the user; and control, in response to the second input, the first application icon to move to a second position, corresponding to the first position, in the second home screen interface. In the embodiments of the present disclosure, the first application icon in the first home screen interface can be moved to the second home screen interface via just the second input performed by the user for the indication identifier, which avoids crossing a relatively long distance between screens, and is simple, fast, and convenient.

It should be noted that the terminal device is the terminal device corresponding to the foregoing method embodiments. All implementations in the foregoing method embodiments are applicable to the embodiment of the terminal device, and a same technical effect can be achieved.

Figure 5:
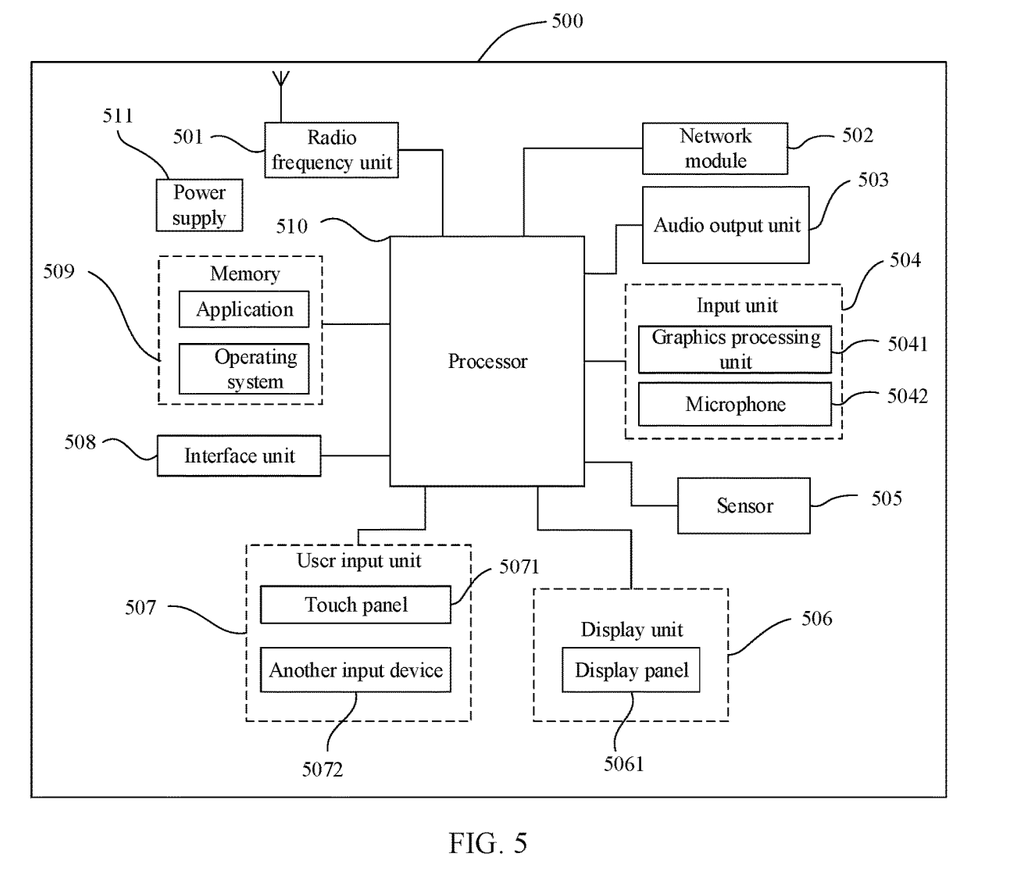
FIG. 5 is a structural block diagram of a terminal device according to an embodiment of the present disclosure.

FIG. 5 is a schematic diagram of a hardware structure of a terminal device implementing the various embodiments of the present disclosure. The terminal device 500 includes, but not limited to: a radio frequency unit 501, a network module 502, an audio output unit 503, an input unit 504, a sensor 505, a display unit 506, a user input unit 507, an interface unit 508, a memory 509, a processor 510, a power supply 511, and the like. A person skilled in the art may understand that the structure of the terminal device shown in FIG. 5 does not constitute a limitation to the terminal device. The terminal device may include more or fewer components than those shown in the figure, or some components may be grouped, or there may be a different component arrangement. In this embodiment of the present disclosure, the terminal device includes but is not limited to a mobile phone, a tablet computer, a notebook computer, a palmtop computer, a vehicle-mounted terminal, a wearable device, a pedometer, or the like.

The processor 510 is configured to: control the user input unit 507 to receive a first input performed by a user for a first application icon in a first home screen interface; control the display unit 506 to display an indication identifier and a thumbnail of a second home screen interface in response to the first input, where an indication end of the indication identifier points to a first position in the thumbnail of the second home screen interface; control the user input unit 507 to receive a second input performed by the user; and control, in response to the second input, the first application icon to move to a second position, corresponding to the first position, in the second home screen interface.

The processor can implement the processes of the foregoing embodiments of the icon moving method, with the same technical effects achieved. To avoid repetition, details are not described again herein.

According to the foregoing technical solutions of the embodiments of the present disclosure, the terminal device is configured to: receive a first input performed by a user for a first application icon in a first home screen interface; display an indication identifier and a thumbnail of a second home screen interface in response to the first input, where an indication end of the indication identifier points to a first position in the thumbnail of the second home screen interface; receive a second input performed by the user; and control, in response to the second input, the first application icon to move to a second position, corresponding to the first position, in the second home screen interface. In the embodiments of the present disclosure, the first application icon in the first home screen interface can be moved to the second home screen interface via just the second input performed by the user for the indication identifier, which avoids crossing a relatively long distance between screens, and is simple, fast, and convenient.

It should be understood that in this embodiment of the present disclosure, the radio frequency unit 501 may be configured to receive and send signals in a process of receiving and sending information or calling. For example, after receiving downlink data from a base station, the radio frequency unit 501 sends the downlink data to the processor 510 for processing; and sends uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may further communicate with a network and another device by using a wireless communication system.

The terminal device provides a user with wireless broadband Internet access via the network module 502, for example, helps the user send and receive emails, browse web pages, and access streaming media.

The audio output unit 503 may convert audio data received by the radio frequency unit 501 or the network module 502 or stored in the memory 509 into an audio signal and output as voice. In addition, the audio output unit 503 may further provide an audio output (for example, call signal receiving sound or message receiving sound) related to a specific function performed by the terminal device 500. The audio output unit 503 includes a speaker, a buzzer, a telephone receiver, and the like.

The input unit 504 is configured to receive an audio signal or a video signal. The input unit 504 may include a graphics processing unit (GPU) 5041 and a microphone 5042. The graphics processing unit 5041 processes image data of a static picture or a video obtained by an image capturing apparatus (for example, a camera) in a video capturing mode or an image capturing mode. A processed image frame may be displayed on the display unit 506. The image frame processed by the graphics processing unit 5041 may be stored in the memory 509 (or another storage medium) or sent via the radio frequency unit 501 or the network module 502. The microphone 5042 may receive sound and can process such sound into audio data. The processed audio data may be converted in a call mode into a format that can be sent by the radio frequency unit 501 to a mobile communication base station for outputting.

The terminal device 500 further includes at least one sensor 505, for example, an optical sensor, a motion sensor, and other sensors. For example, the light sensor includes an ambient light sensor and a proximity sensor. The ambient light sensor may adjust luminance of a display panel 5061 based on brightness of ambient light. The proximity sensor may turn off the display panel 5061 and/or backlight when the terminal device 500 approaches an ear. As a type of motion sensor, an accelerometer sensor may detect acceleration values in directions (that are generally three axes), and detect a value and a direction of gravity when the accelerometer sensor is static, and may be configured to: recognize a terminal posture (for example, screen switching between landscape and portrait modes, a related game, or magnetometer posture calibration), and perform a function related to vibration recognition (for example, a pedometer or a knock), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein again.

The display unit 506 is configured to display information entered by the user or information provided for the user. The display unit 506 may include the display panel 5061, and the display panel 5061 may be configured in a form of a liquid crystal display (LCD), an organic light-emitting diode (OLED), or the like.

The user input unit 507 may be configured to receive input digit or character information, and generate a key signal input related to a user setting and function control of the terminal device. For example, the user input unit 507 includes a touch panel 5071 and another input device 5072. The touch panel 5071 is also referred to as a touchscreen, and may collect a touch operation performed by the user on or near the touch panel 5071 (for example, an operation performed on or near the touch panel 5071 by the user by using any appropriate object or accessory such as a finger or a stylus). The touch panel 5071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 5071 may be implemented by using a plurality of types such as a resistive type, a capacitive type, an infrared ray, and a surface acoustic wave. The user input unit 507 may further include other input devices 5072 in addition to the touch panel 5071. For example, the other input devices 5072 may include but are not limited to a physical keyboard, a function key (such as a volume control key or a power on/off key), a trackball, a mouse, a joystick, and the like. Details are not described herein.

Further, the touch panel 5071 may cover the display panel 5061. When detecting a touch operation on or near the touch panel 5071, the touch panel 5071 transmits the touch operation to the processor 510 to determine a type of a touch event. Then, the processor 510 provides corresponding visual output on the display panel 5061 based on the type of the touch event. Although in FIG. 5, the touch panel 5071 and the display panel 5061 are configured as two independent components to implement input and output functions of the terminal device, in some embodiments, the touch panel 5071 and the display panel 5061 can be integrated to implement the input and output functions of the terminal device. Details are not limited herein.

The interface unit 508 is an interface for connecting an external apparatus to the terminal device 500. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, a headset jack, and the like. The interface unit 508 may be configured to receive an input (for example, data information or power) from an external apparatus and transmit the received input to one or more elements in the terminal device 500, or may be configured to transmit data between the terminal device 500 and the external apparatus.

The memory 509 may be configured to store a software program and various data. The memory 509 may mainly include a program storage area and a data storage area. The program storage area may store an operating system, an application for at least one function (for example, a sound play function or an image play function), and the like. The data storage area may store data (for example, audio data or an address book) or the like created based on use of the mobile phone. In addition, the memory 509 may include a high-speed random access memory, or may include a non-volatile memory, for example, at least one disk storage device, a flash memory, or another volatile solid-state storage device.

The processor 510 is a control center of the terminal device. The processor 510 uses various interfaces and lines to connect all parts of the entire terminal device, and performs various functions and data processing of the terminal device by running or executing the software program and/or module stored in the memory 509 and invoking data stored in the memory 509, thereby performing overall monitoring on the terminal device. The processor 510 may include one or more processing units. Optionally, the processor 510 may integrate an application processor and a modem processor. The application processor mainly processes an operating system, a user interface, an application, and the like. The modem processor mainly processes wireless communication. It can be understood that, alternatively, the modem processor may not be integrated into the processor 510.

The terminal device 500 may further include the power supply 511 (such as a battery) supplying power to each component. Preferably, the power supply 511 may be logically connected to the processor 510 by using a power management system, so as to implement functions such as charging management, discharging management and power consumption management by using the power management system.

In addition, the terminal device 500 includes some functional modules that are not illustrated. Details are not described herein.

Optionally, an embodiment of the present disclosure further provides a terminal device, including a processor, a memory, and a computer program stored in the memory and executable on the processor. The computer program implements, when executed by the processor, each process of the foregoing embodiments of the icon moving method, and a same technical effect can be achieved. To avoid repetition, details are not described herein.

An embodiment of the present disclosure further provides a non-transitory computer-readable storage medium. The non-transitory computer-readable storage medium stores a computer program. When the computer program is executed by the processor, each process of the foregoing embodiments of the icon moving method is implemented, and a same technical effect can be achieved. To avoid repetition, details are not described herein. The non-transitory computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. Without more restrictions, an element defined by a phrase "including a" does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. The method in the foregoing embodiments may also be implemented by hardware. However, in many cases, the former is a preferred implementation. Based on the understanding, the technical solutions of the present disclosure essentially or the part that contributes to the prior art may be embodied in the form of software products. The computer software product is stored in a storage medium (such as ROM/RAM, a magnetic disk and an optical disk), including several instructions for enabling one terminal (which may be a mobile phone, a computer, a server, an air conditioner, or a network device) to implement the method in each embodiment of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

What is claimed is:

1. An icon moving method, performed by a terminal device, wherein the terminal device comprises at least a first home screen interface and a second home screen interface, and the method comprises:
   receiving a first input performed by a user for a first application icon in the first home screen interface;
   displaying an indication identifier and a thumbnail of the second home screen interface in response to the first input, wherein an indication end of the indication identifier points to a first position in the thumbnail of the second home screen interface;
   receiving a second input performed by the user; and
   moving, in response to the second input, the first application icon to display at a second position, corresponding to the first position, in the second home screen interface;
   wherein the displaying the indication identifier and the thumbnail of the second home screen interface in response to the first input comprises:
      displaying the indication identifier and the thumbnail of the second home screen interface in response to the first input, wherein the indication end of the indication identifier points to a predetermined position;
      receiving a third input performed by the user for the indication identifier for adjusting a position to which the indication end of the indication identifier points in the thumbnail of the second home screen interface; and
      controlling, in response to the third input, the indication end of the indication identifier to move from the predetermined position to the first position in the thumbnail of the second home screen interface.

2. The icon moving method according to claim 1, wherein the controlling, in response to the second input, the first application icon to move to a second position, corresponding to the first position, in the second home screen interface comprises:
   in a case that a second application icon is displayed at the second position, grouping the first application icon and the second application icon into a folder, and displaying the folder at the second position.

3. The icon moving method according to claim 1, wherein after the displaying an indication identifier and a thumbnail of the second home screen interface in response to the first input, the method further comprises:
   receiving a fourth input performed by the user for at least one third application icon in the first home screen interface; and
   displaying the at least one third application icon on the indication identifier in response to the fourth input.

4. The icon moving method according to claim 3, wherein after the receiving a second input performed by the user, the method further comprises:
   in response to the second input, controlling the at least one third application icon to be displayed behind the second position in order.

5. The icon moving method according to claim 4, wherein the controlling the at least one third application icon to be displayed behind the second position in order comprises:
   according to an arrangement sequence of the at least one third application icon on the indication identifier, controlling the at least one third application icon to be displayed behind the second position in order.

6. A terminal device, comprising a processor, a memory, and a program stored in the memory and executable on the processor, wherein the program, when executed by the processor, causes the terminal device to perform:
   receiving a first input performed by a user for a first application icon in the first home screen interface;
   displaying an indication identifier and a thumbnail of the second home screen interface in response to the first input, wherein an indication end of the indication identifier points to a first position in the thumbnail of the second home screen interface;
   receiving a second input performed by the user; and
   moving, in response to the second input, the first application icon to display at a second position, corresponding to the first position, in the second home screen interface;
   wherein the first home screen interface and the second home screen interface are two home screen interfaces of the terminal device;
   the displaying the indication identifier and the thumbnail of the second home screen interface in response to the first input comprises:
      displaying the indication identifier and the thumbnail of the second home screen interface in response to the first input, wherein the indication end of the indication identifier points to a predetermined position;
      receiving a third input performed by the user for the indication identifier for adjusting a position to which the indication end of the indication identifier points in the thumbnail of the second home screen interface; and
      controlling, in response to the third input, the indication end of the indication identifier to move from the predetermined position to the first position in the thumbnail of the second home screen interface.

7. The terminal device according to claim 6, wherein the program, when executed by the processor, causes the terminal device to perform:
   in a case that a second application icon is displayed at the second position, grouping the first application icon and the second application icon into a folder, and displaying the folder at the second position.

8. The terminal device according to claim 6, wherein the program, when executed by the processor, causes the terminal device to further perform:
   receiving a fourth input performed by the user for at least one third application icon in the first home screen interface; and
   displaying the at least one third application icon on the indication identifier in response to the fourth input.

9. The terminal device according to claim 6, wherein the program, when executed by the processor, causes the terminal device to further perform:
    in response to the second input, controlling the at least one third application icon to be displayed behind the second position in order.

10. The terminal device according to claim 9, wherein the program, when executed by the processor, causes the terminal device to perform:
    according to an arrangement sequence of the at least one third application icon on the indication identifier, controlling the at least one third application icon to be displayed behind the second position in order.

11. A non-transitory computer-readable storage medium, wherein the computer-readable storage medium stores a program, and the program, when executed by a processor of a terminal device, causes the terminal device to perform:
    receiving a first input performed by a user for a first application icon in the first home screen interface;
    displaying an indication identifier and a thumbnail of the second home screen interface in response to the first input, wherein an indication end of the indication identifier points to a first position in the thumbnail of the second home screen interface;
    receiving a second input performed by the user; and
    moving, in response to the second input, the first application icon to display at a second position, corresponding to the first position, in the second home screen interface;
    wherein the first home screen interface and the second home screen interface are two home screen interfaces of the terminal device;
    the displaying the indication identifier and the thumbnail of the second home screen interface in response to the first input comprises:
        displaying the indication identifier and the thumbnail of the second home screen interface in response to the first input, wherein the indication end of the indication identifier points to a predetermined position;
        receiving a third input performed by the user for the indication identifier for adjusting a position to which the indication end of the indication identifier points in the thumbnail of the second home screen interface; and
        controlling, in response to the third input, the indication end of the indication identifier to move from the predetermined position to the first position in the thumbnail of the second home screen interface.

12. The non-transitory computer-readable storage medium according to claim 11, wherein the program, when executed by the processor, causes the terminal device to perform:
    in a case that a second application icon is displayed at the second position, grouping the first application icon and the second application icon into a folder, and displaying the folder at the second position.

13. The non-transitory computer-readable storage medium according to claim 11, wherein the program, when executed by the processor, causes the terminal device to further perform:
    receiving a fourth input performed by the user for at least one third application icon in the first home screen interface; and
    displaying the at least one third application icon on the indication identifier in response to the fourth input.

14. The non-transitory computer-readable storage medium according to claim 11, wherein the program, when executed by the processor, causes the terminal device to further perform:
    in response to the second input, controlling the at least one third application icon to be displayed behind the second position in order.

15. The non-transitory computer-readable storage medium according to claim 14, wherein the program, when executed by the processor, causes the terminal device to perform:
    according to an arrangement sequence of the at least one third application icon on the indication identifier, controlling the at least one third application icon to be displayed behind the second position in order.

* * * * *